(12) United States Patent
Lee

(10) Patent No.: US 6,895,260 B2
(45) Date of Patent: May 17, 2005

(54) HANDS-FREE HANDSET FOR A CORDLESS TELEPHONE

(76) Inventor: Ching-Chuan Lee, No. 9, Lane 50, Sec. 3, Muhsin Road, Taipei (TW)

(*) Notice: Subject to any disclaimer, the term of this patent is extended or adjusted under 35 U.S.C. 154(b) by 663 days.

(21) Appl. No.: 10/051,161

(22) Filed: Jan. 22, 2002

(65) Prior Publication Data

US 2003/0050101 A1 Mar. 13, 2003

(30) Foreign Application Priority Data

Sep. 10, 2001 (TW) .................................. 90215498 U

(51) Int. Cl.[7] .............................................. H04B 1/38
(52) U.S. Cl. .............................. 455/569.1; 455/569.2; 455/557; 455/426.1
(58) Field of Search .......................... 455/569.1, 569.2, 455/557, 552.1, 553.1, 550.1, 426.1, 90.3, 575.1, 462

(56) References Cited

U.S. PATENT DOCUMENTS

| | | | | |
|---|---|---|---|---|
| 4,053,717 A | * | 10/1977 | Snider ........................ | 455/462 |
| 5,416,829 A | * | 5/1995 | Umemoto ................ | 455/553.1 |
| 5,526,403 A | * | 6/1996 | Tam ........................ | 455/426.1 |
| 5,771,464 A | * | 6/1998 | Umemoto et al. ....... | 455/553.1 |
| 6,125,139 A | * | 9/2000 | Hendrickson et al. ... | 455/553.1 |
| 6,154,639 A | * | 11/2000 | Kanazumi et al. ....... | 455/569.1 |
| 2004/0097264 A1 | * | 5/2004 | Bodnar et al. ........... | 455/550.1 |

* cited by examiner

*Primary Examiner*—Edward F. Urban
*Assistant Examiner*—Lana Le
(74) *Attorney, Agent, or Firm*—Troxell Law Office, PLLC

(57) ABSTRACT

In a hands-free handset for a cordless telephone adapted for household use and including a base unit and a handset, the handset includes an automatic receiving and automatic hanging-up control loop, a voice loop and a port switching device. When the user plugs a speaker jack into a speaker socket of the port switching device, the voice loop will switch the voice signal to the automatic receiving and automatic hanging-up control loop, whereby the handset can automatically receive the voice signal or automatically hangs up.

2 Claims, 5 Drawing Sheets

HANDS-FREE HANDSET FOR A CORDLESS TELEPHONE

BACKGROUND OF THE INVENTION

1. Field of the Invention

The invention relates to a hands-free handset for a cordless telephone, more particularly to a hands-free handset for a household cordless telephone to enable conduct of telephone conversations without holding the handset.

2. Description of Related Art

A conventional cordless telephone for household use generally includes a base unit and a handset. The user can use the handset to make telephone from home or within a certain range thereof via wireless communication, which is quite convenient. However, the user has to hold the handset while conducting a telephone conversation. In many environments such as grocery stores and offices, as the user may need to work while conducting a telephone conversation, holding the handset is inconvenient.

SUMMARY OF THE INVENTION

The primary object of the invention is to provide a hands-free handset for a cordless telephone, in which a handset is additionally provided with an input port for connection to an external peripheral circuit (such as speaker, microphone). After the connection, the handset can have a hands-free function to allow the user to carry the handset along while plugging the speaker into the ear and hanging the microphone by the mouth or throat so as to enable the user to conduct a telephone conversation while working, thereby enhancing work efficiency.

Accordingly, the hands-free handset is adapted for a household cordless telephone including a base unit and a handset. The handset includes an automatic receiving and automatic hanging-up control loop, a voice loop and a port switching device. When the user plugs a speaker jack into a speaker socket of the port switching device, the voice loop will switch the voice signal to the automatic receiving and automatic hanging-up control loop, whereby the handset can automatically receive the voice signal or automatically hangs up.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
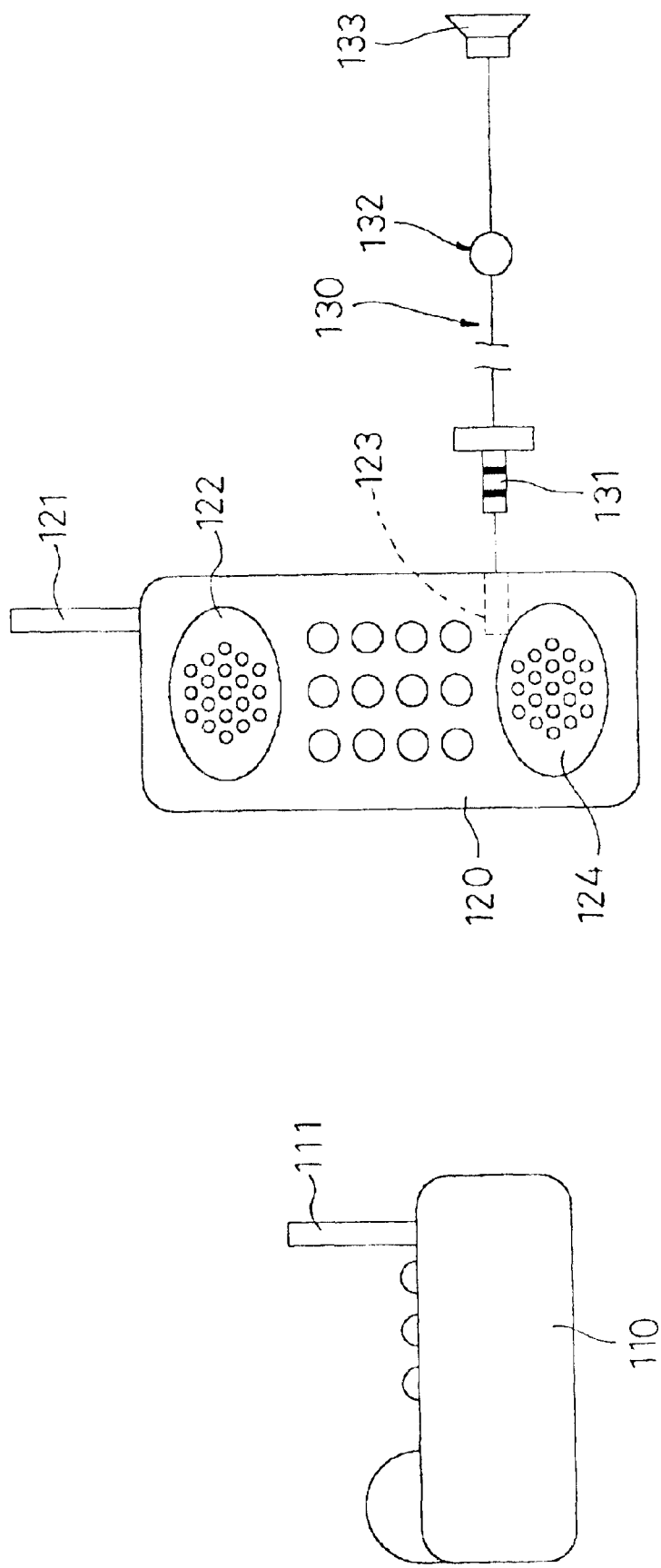
FIG. 1 is a schematic view illustrating connection of a preferred embodiment of a hands-free handset of the invention to a base unit of a cordless telephone.

Reference is made to FIG. 1, which depicts a preferred embodiment of a handset 120 according to the invention connected to a base unit 110 in a cordless telephone. The base unit 110 and the handset 120 intercommunicate via wireless radio frequency signals. The base unit 110 and the handset 120 respectively have antennae 111, 121, for transmitting and receiving frequency signals. The handset 120 is provided with a conventional speaker 122 and a microphone 124 for emitting the voice of the person making the call and receiving the voice of the user, respectively. The handset 120 of the invention differs from the prior art in that the handset 120 is additionally provided with a socket 123 for insertion of a speaker jack. A peripheral circuit 130 includes a jack 131, a microphone 132 and a speaker 133 for transmitting the voice signals of the user to the handset 120. When the user inserts the jack 131 into the socket 123, the voice of the person making the call can be received via the speaker 133 or transmitted to the handset 120 via the microphone 132. Thus, when the user carries the handset 120, puts the speaker 133 in the ear, and hangs the microphone 132 near the mouth or throat, the user can talk on the phone while walking or working, thereby enhancing work efficiency.

Figure 2:
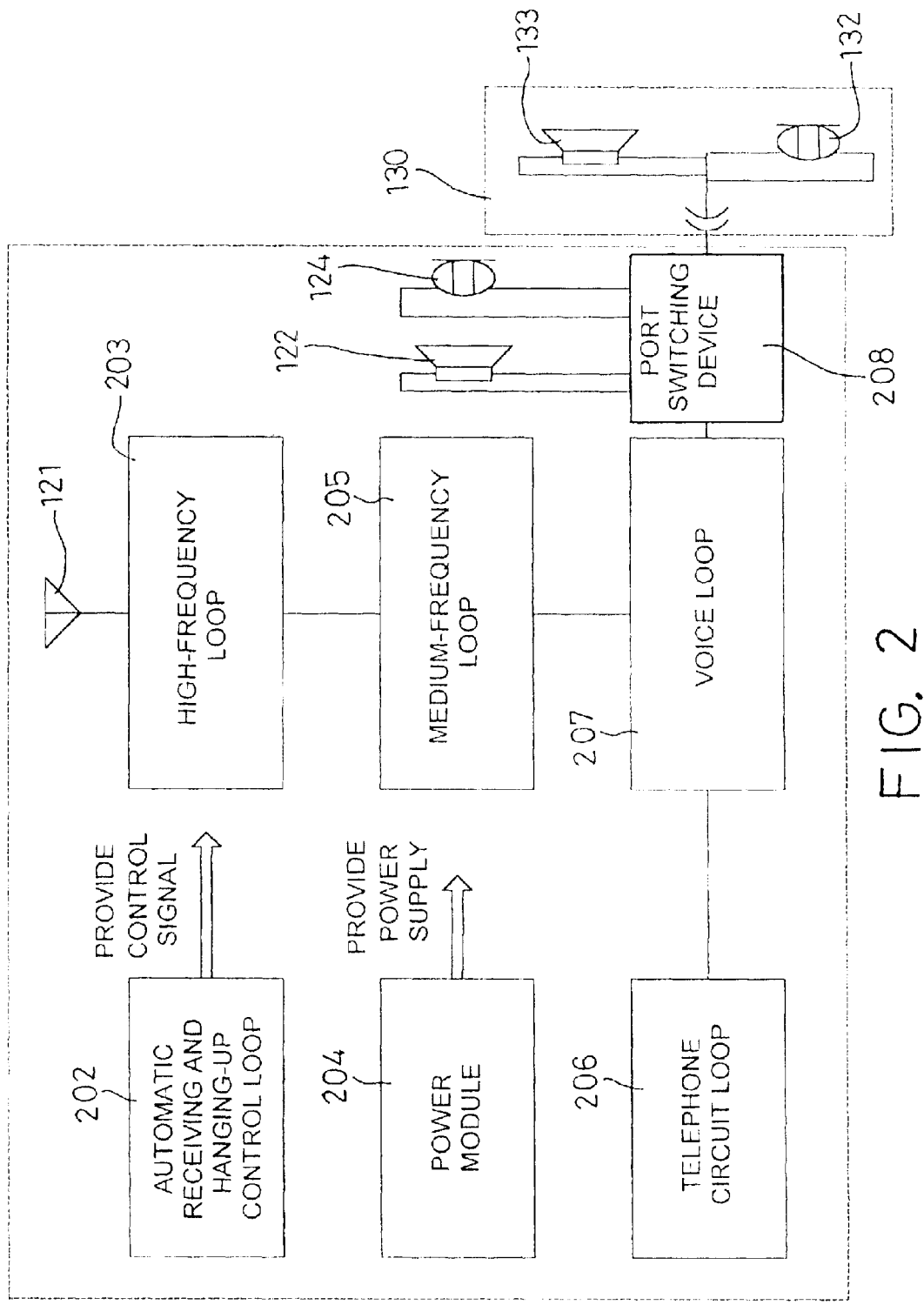
FIG. 2 is a block diagram of the handset of the preferred embodiment of the invention.

FIG. 2 is a block diagram of a preferred embodiment of the cordless telephone handset according to the invention. As shown, the handset 120 includes an antenna 121 for transmitting and receiving frequency signals. An automatic receiving and hanging-up control loop 202 includes the following functions: detecting a ringer signal, thereby controlling and realizing the automatic receiving function; detecting a busy signal, thereby realizing the function of automatically hanging up the phone after the other party hangs up; controlling frequencies of reception and transmission circuits to avoid interfering channels; verifying handset code to eliminate error actions; and detecting use state of battery. A high-frequency loop 203 is provided to process frequency signals received by the antenna 121 and converts the same into a medium-frequency signal. A power module 204 is provided to provide the necessary power to each of the block circuits of the handset 120. A medium-frequency loop 205 is provided to receive medium-frequency signals processed by the high-frequency loop 203, and converts the same into voice signals. A telephone circuit loop 206 is provided to process telephone related functions. A voice loop 207 is provided to process the voice signals of the caller and the recipient. A port switching device 208 is provided to switch a voice signal output to an external speaker 133 and microphone 132 or internal speaker 122 or microphone 124. The high-frequency loop 203, power module 204, medium-frequency loop 205 and telephone circuit loop 206 are known in the art and are not features of the invention. A detailed description thereof will be dispensed with. The following description is directed to the automatic receiving and automatic hanging-up control loop 202, voice loop 207 and port switching device 208, which are characterizing features of the invention.

Figure 3:
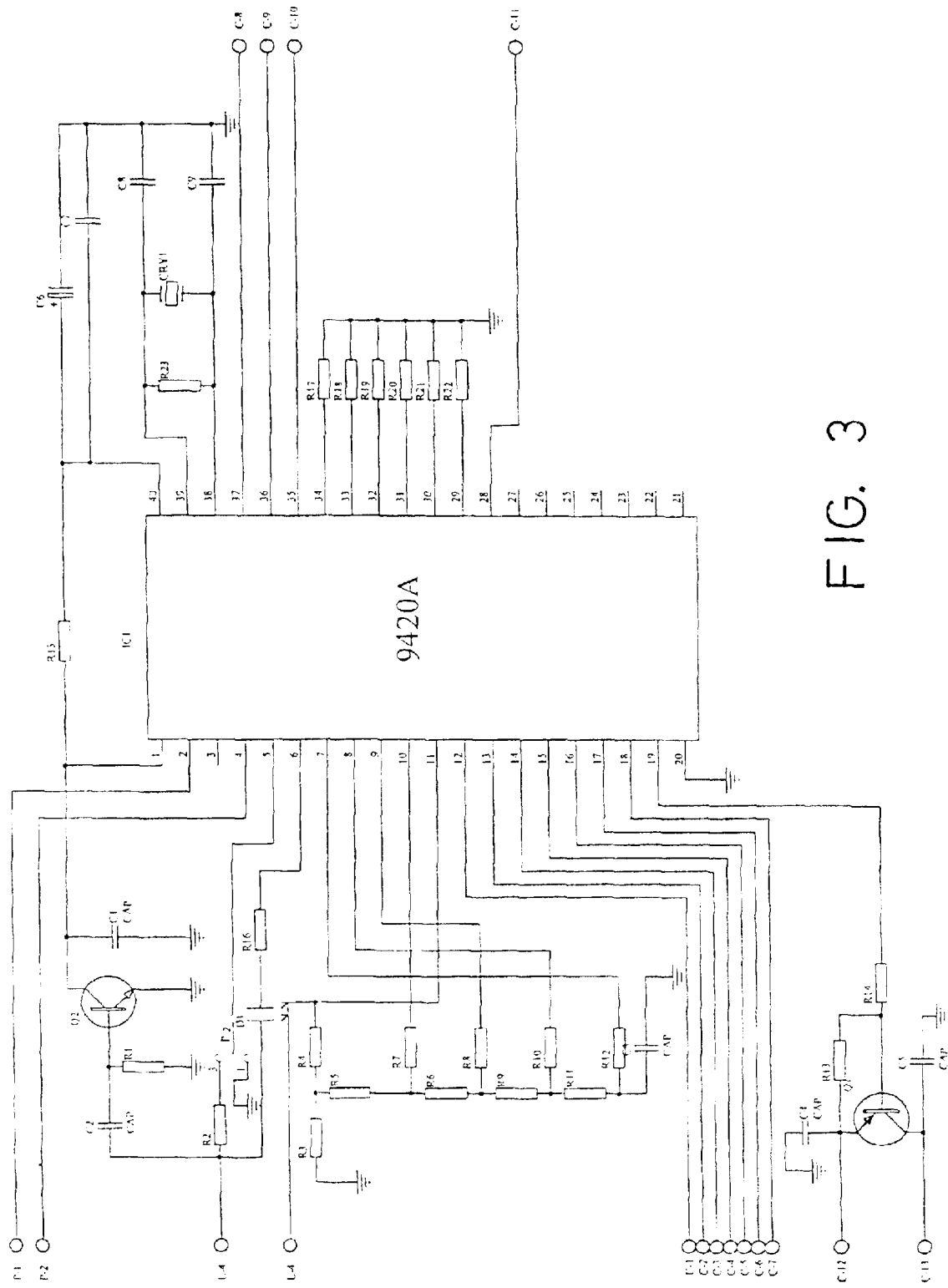
FIG. 3 is a circuit diagram of an automatic receiving and automatic hanging-up control loop of the preferred embodiment of the invention.

FIG. 3 shows a circuit diagram of a preferred embodiment of the automatic receiving and automatic hanging-up control loop of the cordless telephone handset according to the invention. As shown, the automatic receiving and automatic hanging-up control loop 202 is composed of a microprocessor chip under serial number WEN 9420A and other external components, and has the following functions: detecting a ringer signal to control and realize the automatic receiving function; detecting a busy signal to realize the function of automatically hanging up after the other party hangs up; controlling frequencies of reception and transmission circuits to avoid interfering channels; verifying handset code to eliminate error actions; and detecting use state of the battery.

In FIG. 3, CRY1 and external components provide the microprocessor with the required working hour pulses, and drive the microprocessor. Input ends C10 to C13 of microprocessor select correct and appropriate high-frequency transmission and reception frequencies and avoiding interfering channels. Input ends C6 to C7 provide voice loop 207 with the required detection switching and control signals. Resistors R3 to R12 and capacitor C3 constitute a D/A network, to produce the require simulation signals. Input end L-4 detects circuit work status and provides a ringer signal detecting signal for automatic hanging up, generating an indicating ring, detecting a busy signal and a hanging up ring signal, thereby realizing the automatic hanging-up function.

Figure 4:
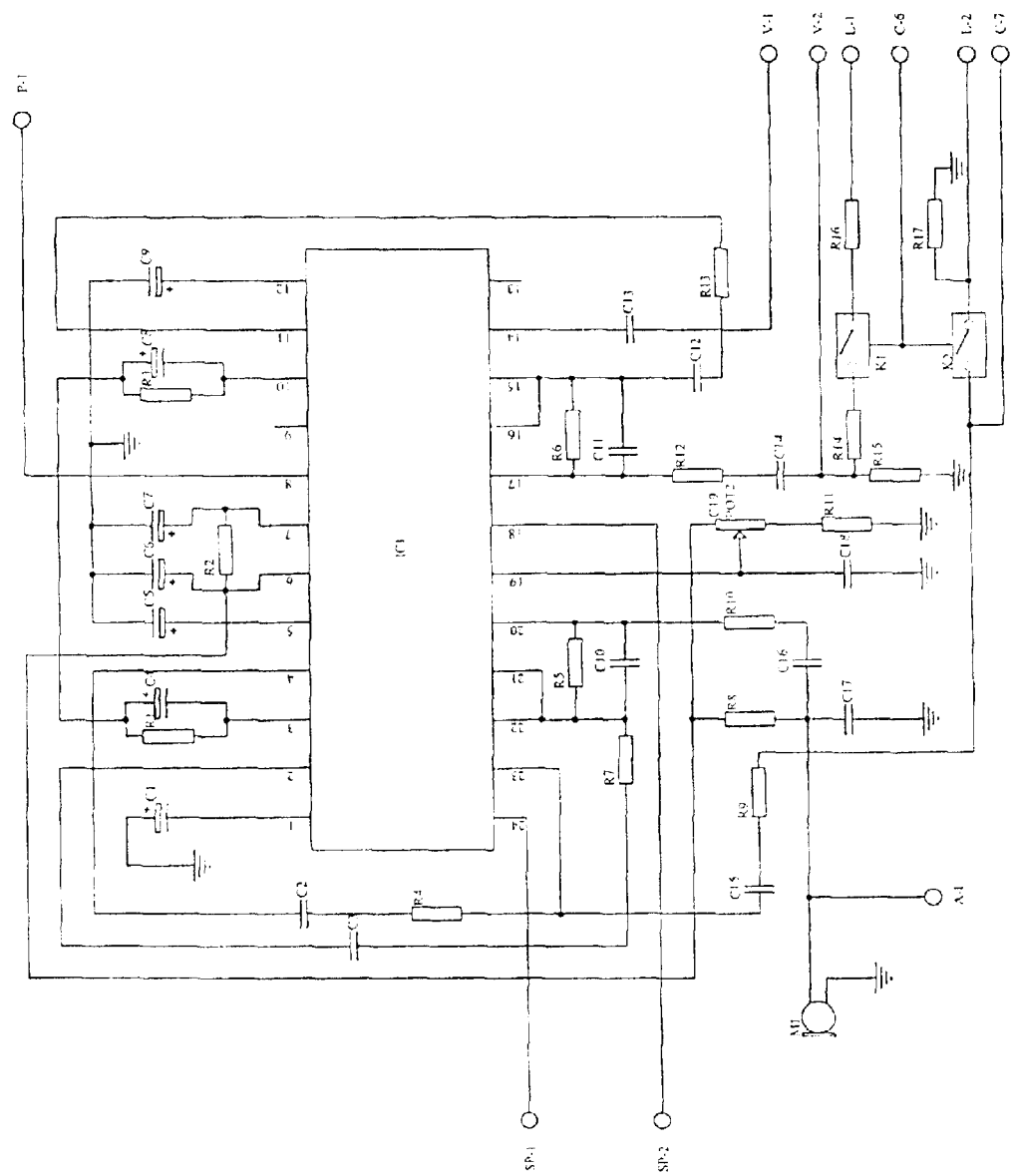
FIG. 4 is a circuit diagram of a voice loop of the handset of the preferred embodiment of the invention.

FIG. 4 illustrates a circuit diagram of a preferred embodiment of a voice loop of the cordless telephone handset according to the invention. As shown, the voice loop 207 of the invention has the following functions: demodulating the signal received by a medium-frequency loop 205 for conversion back to the voice signal which is amplified for subsequent output; amplifying and modulating the audio signal received via a microphone 124 for output to the medium-frequency loop 205 for subsequent amplification and transmission; and detecting intensity of voices of both parties to realize an automatic gain modulation function and to reduce edge sounds to a certain extent.

In FIG. 4, the voice loop 207 mainly includes a low-frequency signal processing IC and other external components. M1 picks up outside signals that are sent via RC filter network to the IC for amplification. After automatic voltage control via the IC, the signals are sent via an edge sound loop to the medium-frequency loop 205. Voice signals sent via the medium-frequency loop 205 are modified, filtered and amplified by the IC for subsequent transmission to speaker 122. R1, R4, R3 and C8 comprise a voice transmitting and receiving balancing loop. POT2 modulates the received sound volume. K1, K2 and external components comprise a switching circuit. R7, R5 and C10 and IC comprise an edge sound network. R6, C11 are automatic gain feedback networks.

Figure 5:
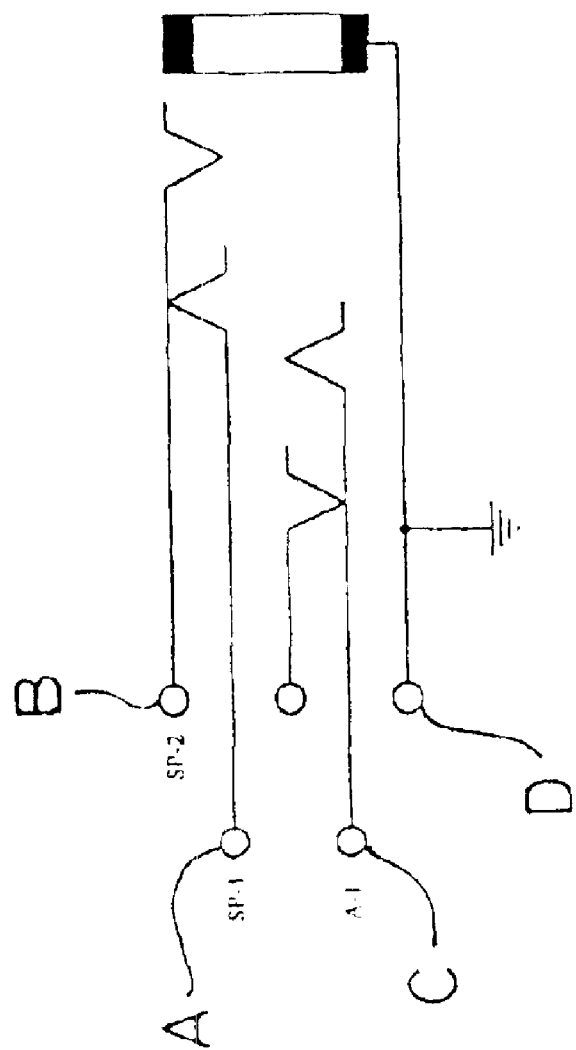
FIG. 5 is a circuit diagram of a port switching device of the handset of the preferred embodiment of the invention.

FIG. 5 is a circuit diagram of a preferred embodiment of the port switching device of the cordless telephone handset according to the invention. As shown, the port switching device 208 of the invention has the following functions: realizing switching between an external speaker 133 and microphone 132, i.e., automatically using the speaker 122 and microphone 124 built in the handset 120 prior to connection to the external speaker 122 and microphone 132. After connecting the external speaker 133 and microphone 132, the port switching device 208 automatically cuts off the internal speaker 122 and microphone 124, and switches to the external speaker 133 and microphone 132 so as to realize the hands-free function. As shown, contacts A, C are normal close contacts. In the absence of the external jack 131, the signal of the built-in microphone and the voice signals received thereby are transmitted via contacts A, C to the voice loop 207 and the built-in speaker 122, respectively. When the external jack 131 is fitted, the signal of the external microphone 132 and the voice signals received thereby are transmitted via contacts B, D to the voice loop 207 and speaker 133.

In view of the foregoing, the hands-free handset for a cordless telephone according to the invention has the advantage that the user can carry the handset, plugs the speaker into the ear, and hangs the microphone near the mouth or throat so as to be able to conduct a telephone conversation while working, thereby enhancing work efficiency.

Although the present invention has been illustrated and described with reference to the preferred embodiment thereof, it should be understood that it is in no way limited to the details of such embodiment but is capable of numerous modifications within the scope of the appended claims.

What is claimed is:

1. A hands-free handset for a cordless telephone adapted for household use, said cordless telephone including a base unit and a handset, said handset comprising:

an automatic receiving and automatic hanging-up control loop for detecting a ringer signal to control and realize an automatic receiving function, detecting a busy signal to realize a function of automatically hanging up after the other party hangs up, controlling frequencies of reception and transmission circuits so as to avoid interfering channels; verifying a code of said handset to eliminate error actions; and detecting use state of a battery;

a voice loop for demodulating a signal received by a medium-frequency loop for conversion back to a voice signal for subsequent amplification and output, amplifying and modulating a voice signal received by a microphone and outputting the same to the medium-frequency loop for amplification and transmission; and detecting intensity of voices of both parties to realize an automatic gain modulating function and to reduce edge sounds to a certain extend; and a port switching device for realizing switching between an external speaker and an external microphone, that is, automatically using a speaker and a microphone built in said handset prior to connection of said external speaker and said external microphone to said handset, and automatically cutting off said speaker and said microphone built in said handset and switching to said external speaker and said external microphone after connection of said external speaker and said external microphone to said handset, thereby realizing a hands-free function.

2. The hands-free handset for a cordless telephone according to claim 1, wherein said automatic receiving and automatic hanging-up control loop includes a microprocessor chip under serial number WEN-9420A and other external components.

* * * * *